United States Patent [19]
Danesh

[11] 3,870,749
[45] Mar. 11, 1975

[54] PREPARATION OF SALTS AND COMPLEXES OF SUBSTITUTED OXYACETATE

[76] Inventor: André Danesh, 8 Browne St., Brookline, Mass. 02146

[22] Filed: Mar. 10, 1971

[21] Appl. No.: 123,025

[52] U.S. Cl. ...... 260/484 P, 260/429.9, 260/439 R, 260/484 R, 260/535 P, 260/535 R
[51] Int. Cl. .................... C07c 59/22, C07c 69/66
[58] Field of Search ............... 260/535 P, 484 P

[56] References Cited
UNITED STATES PATENTS
3,431,298    3/1969    Saotome et al.................. 260/535 P OTHER PUBLICATIONS
H. H. Szmant: Organic Chemistry 1957 pg. 391.
Hackh's: Chemical Dictionary 1944 pg. 273.

*Primary Examiner*—Lorraine A. Weinberger
*Assistant Examiner*—Paul J. Killos
*Attorney, Agent, or Firm*—Dike, Bronstein, Roberts Cushman & Pfund

[57] ABSTRACT

This invention relates to derivatives of oxyacetate and to processes for formation of such derivatives. In one embodiment of the invention, there is formed metal salts or diglycolic acid by a direct synthesis of formaldehyde with carbon monoxide in aqueous medium at elevated temperature and pressure. In another embodiment of the invention, there is formed polyoxyalkylene carboxylic acids by the reaction of a salt of glycolic acid and an alkylene oxide at elevated temperature and pressure.

9 Claims, No Drawings

PREPARATION OF SALTS AND COMPLEXES OF SUBSTITUTED OXYACETATE

This invention relates to the preparation of derivatives of oxyacetic acid and more particularly, to the preparation of metal salts of diglycolic acid and polyoxyalkylene carboxylic acids.

One object of the present invention is to provide improved processes for the preparation of disodium diglycolate (D.D.G.A.). These processes are as follows: (a) reaction of formaldehyde with carbon monoxide in the presence of water or alcohol and an alkaline catalyst; (b) reaction of formaldehyde with carbon monoxide in the presence of water or an aliphatic alcohol and an acidic catalyst, wherein the ratio of formaldehyde to carbon monoxide ranges between one to one and two to one. The mixture is adjusted with sodium hydroxide at a pH between 5 and 6 to obtain the D.D.G.A; (c) reaction of formaldehyde with sodium glycolate and carbon monoxide in the presence of water and preferably an alkaline catalyst; (d) reaction of formaldehyde with the esters of glycolic acid and carbon monoxide in the presence of an aliphatic alcohol and an acidic catalyst; (e) hydrolysis of esters of diglycolic acid in a basic medium; (f) by elimination of one mole of water from two moles of a glycolic acid derivative such as glycolonitrile, esters of glycolic acid, and sodium glycolate. Using glycolnitrile as an example, it is converted to diglycolonitrile in the presence of an acidic or alkaline catalyst. The diglycolonitrile is then hydrolized in either an acidic or a basic medium to form diglycolic acid and disodium diglycolate.

An additional object of the invention is to provide a method for the formation of polyoxyalkylene carboxylic acids and salts thereof by reaction of an alkaline oxide with a salt or ester of glycolic acid using elevated temperatures and pressures.

Another object of the invention is to provide an economical process for the preparation of salts of substituted oxyacetate from inexpensive raw materials.

A further object of the present invention is to prepare the metal salts or complexes of the compounds of this invention. These salts and complexes are stable at a low and a high pH, and are useful in pharmaceutical and agricultural applications. For example, the iron and zinc complexes of these compounds could be used for the correction of metal deficiency in plants and mammals.

For the preparation of disodium diglycolate, it is preferable to use temperatures higher than 30°C temperatures up to 120°C being suitable at atmospheric or higher pressures though pressures in excess of atmospheric pressure are preferred and pressures of up to 200 atmospheres can be employed if desired, especially towards the latter part of the reaction. It is also preferable to use an acidic or alkaline catalyst in the presence or absence of a solvent such as water and aliphatic alcohols. Hydrochloric acid and sodium hydroxides are examples of acid and alkaline catalysts respectively. It is also preferable in some cases to use first an excess of formaldehyde relative to the amount of carbon monoxide in order to minimize the formation of glycolic acid, and salts of glycolic acid and then to use a higher percentage of carbon monoxide for the final portion of the reaction.

EXAMPLE 1.

One mole of sodium glycolate was mixed with about 200cc of water and one mole of formaldehyde in a high pressure autoclave. A carbon monoxide atmosphere was superimposed above the liquid and the pressure increased to between 100 and 200 atmospheres. The autoclave and contents were heated at a temperature of 100° to 110°C. for about 3 hours. After cooling, the sodium hydroxide solution was added to the reaction mixture and the pH was adjusted to about 6. The mixture was evaporated to dryness and disodium diglycolate along with some sodium formate and some unreacted sodium glycolate were obtained.

EXAMPLE 2.

The procedure of Example 1 is repeated by mixing one mole of sodium glycolate, four grams of sodium hydroxide and one mole of formaldehyde with 200 cc of water. Disodium diglycolate along with some sodium formate and some unreacted sodium glycolate were obtained.

EXAMPLE 3.

Two moles of formaldehyde were mixed with two moles of water and 0.25 mole of hydrochloric acid in a high pressure autoclave. A carbon monoxide atmosphere was superimposed above the liquid and the pressure increased to between 2 to 10 atmospheres. The autoclave and contents were heated at a temperature of 100° to 120°C. During the heating the pressure decreased and more carbon monoxide was added. This was continued until the pressure remained stable. After cooling, more carbon monoxide atmospheres were added and the pressure increased to between 100 to 200 atmospheres. The autoclave and contents again were heated at a temperature of 100° to 120°C. for 2 hours. After cooling, sodium hydroxide solution was added to the reaction mixture and the pH was adjusted to about 6. The mixture was evaporated to dryness and disodium diglycolate along with some sodium formate and some unreacted sodium glycolate were obtained.

EXAMPLE 4.

Methyl alcohol may be substituted in Example 3 in order to prepare dimethyl diglycolate which may then be hydrolyzed with sodium hydroxide to disodium diglycolate.

EXAMPLE 5.

The esters of diglycolic acid are converted to the alkaline salts by hydrolysis in the presence of alkali. 0.10 mole of dimethyl diglycolate was mixed with 50 cc. of water. 200 cc. of one normal sodium hydroxide solution were added slowly to the mixture for a period of 15 minutes. The mixture was heated at 60°–70°C. and the methanol which formed during the hydrolysis was distilled off. After about 1 hour, the hydrolysis was completed. The mixture was evaporated to dryness and the disodium salt of diglycolic acid was obtained.

EXAMPLE 6.

One mole of methyl glycolate was mixed with about 200 cc of methanol, 0.25 mole of hydrochloric acid and one mole of formaldehyde in a high pressure autoclave. A carbon monoxide atmosphere was superimposed above the liquid and the pressure increased to between 100 and 200 atmospheres. The autoclave and contents were heated at a temperature of 100° to 110°C. for about 3 hours and the dimethyl diglycolate along with some methyl formate and some unreacted methyl glycolate were obtained.

EXAMPLE 7.

One mole of formaldehyde was mixed with 100 cc of one normal sodium hydroxide in a high pressure autoclave. A carbon monoxide atmosphere was superimposed above the liquid and the pressure increased to between 100 and 200 atmospheres. The mixture and the autoclave were heated at a temperature of 120° to 140°C. for 2 to 3 hours. After cooling, the pH of the mixture was adjusted with sodium hydroxide to about 5. The mixture was evaporated to dryness and sodium glycolate along with some sodium formate and some disodium diglycolate were obtained.

EXAMPLE 8.

0.10 mole of methyl glycolate was mixed with 2 cc of hydrochloric acid in a high pressure autoclave equipped with a thermocouple, pressure gage and reactant inlet tube. Ethylene oxide gas was superimposed above the mixture and the pressure increased to between 10 to 20 atmospheres. The autoclave and contents were heated a temperature of 80° to 100°C. During the heating the pressure decreased and more ethylene oxide was added. This was repeated until the pressure remained almost stable. After cooling, 200 cc of water were added to the reaction mixture. The sodium hydroxide solution was added, the mixture was heated at 50° to 60°C. and the pH was adjusted to about 5. The mixture was evaporated to dryness and white compounds were obtained. These products have the following formula: $H(O-CH_2-CH_2)_m-O-CH_2-COONa$ wherein $M$ is a whole number equal to from 0 to 300. The propylene oxide, $\alpha,\beta$, alkylene oxide and the mixture of $\alpha,\beta$, alkylene oxide and ethylene oxide could be substituted for ethylene oxide in the above example in order to prepare the mono and polyoxyalkylene glycolate. Glycolic acid could also be substituted for esters of glycolic acid in the above example in order to prepare the compounds with the following formula: $H(O-CHR_1-CHR_2)_m-O-CH_2COO(CHR_2-CHR_1-O)_nH$, wherein $m$ and $n$ are whole numbers equal to from 0 to 300, and $R_1, R_2$ are selected from the group of H or an alkyl having up to six carbon atoms.

EXAMPLE 9.

0.10 mole of sodium glycolate was mixed with 50 cc of water and one gram of sodium hydroxide in a high pressure autoclave. Ethylene oxide gas was superimposed above the mixture and the pressure increased to between 10 to 20 atmospheres. The autoclave and contents were heated at a temperature of 80° to 100°C. During the heating the pressure decreased and more ethylene oxide was added. This was repeated until the pressure remained almost stable. The mixture was evaporated to dryness and white compounds were obtained. These products have the following formula $H(O-CH_2-CH_2)_m-O-CH_2-COONa$, wherein $m$ is a whole number equal to from 0 to 300. These compounds are prepared by the reaction of alkylene oxide and the reactive hydrogen compounds of glycolic acid at high temperature and pressure in the presence or absence of an acidic or an alkalin type catalyst. The condensation reaction could also be carried out in the presence or absence of water, organic solvents and an acidic or an alkalin type catalyst. These products have a greater cleaning power than disodium diglycolate and act to keep solid particles, greases and oils in suspension in the wash water and prevent the redeposition of soil on the articles being cleaned. These compounds are also effective as a water softner and combine with metalic ions to form soluble complexes which will not be deposited on the articles being cleaned.

EXAMPLE 10.

The polyoxyalkylene compounds may be oxidized to their corresponding acids which will be converted to their alkalin salts by an inorganic base. One part of vanadium pentoxide is mixed with 200 parts of 60 percent nitric acid, the mixture is stirred and heated to about 70°C. Sixty parts of a polyoxyalkylene such as tetraethylene glycol are then added gradually with stirring for a period of 3 hours. The reaction mixture is heated at 70°–80°C. for another 2 hours and then water and the excess of nitric acid were evaporated. The corresponding diacid such as triethylene dioxydiacetic acid was recovered. The diacid is dissolved in water, the sodium hydroxide solution was added, and the pH of the mixture was adjusted to about 6. The mixture was evaporated to dryness and the corresponding disodium salt was obtained.

EXAMPLE 11.

0.10 mole of disodium diglycolate was dissolved in 100cc of water. To this solution was added 0.10 mole of calcium chloride in 200 cc of water. The mixture was evaporated and calcium diglycolate was obtained.

EXAMPLE 12.

0.10 mole of disodium diglycolate was dissolved in 200 cc of water. To this solution 0.10 mole of calcium carbonate was added. After stirring for about 15 minutes the mixture was filtered and then was evaporated to dryness. Calcium diglycolate was obtained.

EXAMPLE 13.

0.10 mole of disodium diglycolate was dissolved in 100 cc of water. To this solution was added 0.05 mole of ferric chloride in 100 cc of water. A yellowish solution was prepared. The mixture was filtered and then was evaporated to dryness. The monosodium ferric bisdiglycolate was obtained. This iron salt is stable at high pH and can be used for hte correction of iron deficiency occurring in plants grown in alkalin soils and acid soils.

EXAMPLE 14.

0.10 mole of disodium diglycolate was dissolved in 100 cc of water. To this solution was added 0.10 mole of zinc acetate in 200 cc of water. The mixture was filtered and after evaporation a white product, namely zinc glycolate, was obtained.

The compounds of this invention may be used for the replacement of phosphates and N.T.A. in detergents. The compounds of this invention used in detergent formulations do not contain either phosphorous or nitrogen in their structure, therefore, they do not promote algae in the water. They also have cleaning power, water softening power and other valuable properties rendering them suitable for many purposes in the detergent industry. I also found that most of the compounds of this invention are biodegradable and non-toxic.

I claim:

1. A process for the preparation of the disodium salt of diglycolic acid or lower alkyl ester thereof, said process comprising reacting formaldehyde with a member selected from the group consisting of carbon monoxide and sodium glycolate, said reaction being performed in a liquid medium selected from the group of water and a lower alkyl alcohol at a temperature in excess of 30°C. and a pressure in excess of 1 atmosphere in the presence of sodium hydroxide.

2. The process of claim 1 where the temperature is in excess of 100°C and the pressure is in excess of 10 atmospheres.

3. The process of claim 2 where the pressure is between 100 and 200 atmospheres.

4. The process of claim 3 where the reactants are formaldehyde and carbon monoxide.

5. The process of claim 3 where the reactants are formaldehyde and sodium glycolate.

6. The process of claim 3 in aqueous media.

7. The process of claim 3 in alkyl alcohol media.

8. The process of claim 7 in methanol.

9. The process of claim 8 where the sodium hydroxide is put in contact with the reactants subsequent to reaction with methanol to form the methyl ester.

* * * * *